United States Patent [19]

Vaughan

[11] 4,240,155
[45] Dec. 16, 1980

[54] DIPLEXER AND MULTIPLEXER
[75] Inventor: Thomas J. Vaughan, Manchester, N.H.
[73] Assignee: Micro Communications, Inc., Manchester, N.H.
[21] Appl. No.: 920,004
[22] Filed: Jun. 28, 1978
[51] Int. Cl.³ ............................................. H04J 1/08
[52] U.S. Cl. ...................................... 370/69; 370/37
[58] Field of Search ......... 179/15 FD, 15 FS, 15 FE; 178/61; 343/176, 200, 204, 207; 325/3; 333/6, 10, 11; 370/37, 69

[56] References Cited
U.S. PATENT DOCUMENTS

3,735,289   5/1973   Bruene ........................................ 333/6
4,029,902   6/1977   Bell ................................. 179/15 FD Primary Examiner—Bernard Konick
Assistant Examiner—Joseph A. Popek
Attorney, Agent, or Firm—Robert T. Dunn

[57] ABSTRACT

A plurality of different frequency signals $f_1, f_2, f_3, \ldots f_n$ are combined for transmission in a common transmission line by a series of hybrid circuits each including a through coupler for feeding through frequency signals through the hybrid circuit to the output thereof, an injection coupler for feeding an injected frequency signal to the hybrid output and one or more tuned circuits between the couplers that are tuned to the frequency of the injected frequency signal and connected to the couplers by a stub transmission line of electrical length in terms of wave lengths of the through frequency, so that substantially all power of the through frequency signal and all power of the injected frequency signal flow from the hybrid circuit output to the next hybrid circuit in the series.

22 Claims, 13 Drawing Figures

DIPLEXER AND MULTIPLEXER

BACKGROUND OF THE INVENTION

The present invention relates to diplexers and multiplexers for combining the powers of two or more different frequency signals such as different frequency modulated, FM, channels in a single common transmission line or in a single master antenna so that both channels are broadcast from the master antenna. A diplexer incorporating features of the invention may also combine the video and audio power of a TV channel for broadcast by a single master antenna.

Heretofore, diplexers have been provided for combining the power of two different frequency channels and feeding the combined power to a common transmission line and/or a common master antenna. For example, the power of several frequency modulated (FM) radio channels can be broadcast from a single master antenna by combining the powers in a diplexer or in a series of diplexers called a multiplexer, that feeds the master antenna. A similar diplexer has also been used to combine the audio and video power of a TV channel so that both may be broadcast from a single master antenna. Diplexers used in the past are a hybrid circuit including two directional couplers, one for coupling the through frequency channel, ft, and the other for coupling the injected frequency channel, fi, to the master antenna. In order to insure that there is a minimum insertion loss incurred for each channel fed through the diplexer to the antenna, the terminals of the diplexer to which the channels feed power must be electrically isolated from each other. In the past, this has been achieved in several ways.

According to one technique, called the long stub technique, a long line type of stub which is capacitively capped is provided between the two couplers. The length of the long line must be many wave lengths of the carrier frequency and one quarter wave length of the difference frequency between the carriers of the two channels (fi-ft). In a typical case where two FM channels, separated in frequency by 800 KHz, are combined by the diplexer, the stub must be about 370 feet long. This stub, alternately with frequency, puts a very high and very low impedance between the two couplers. The low impedance occurs at the injected frequency, fi, and so that frequency is reflected at the stub, (just as a short circuit reflects), to the output of the diplexer with negligible insertion loss. The high impedance occurs at the through frequency, ft, and so the through frequency passes the stub substantially unaffected and so is conducted through both couplers to the diplexer output with negligible insertion loss. One limitation of this technique is that ft must fall within a preset frequency slot depending on fi-ft and the stub length and, usually, a diplexer of this type cannot be used with more than the two frequencies, one ft and one fi, and it cannot be readily tuned in the field. Furthermore, since the stub is capacitively capped and such capacitance is sensitive to temperature and environmental changes, it is necessary to tune the diplexer frequently to compensate for these changes.

According to another technique, called the direct coupled technique, tuned cavities are provided between the through and injection directional couplers of the hybrid diplexer. These cavities may be either loop coupled or probe coupled and are tuned very tightly to the injected frequency, fi, and are connected as close as possible to the transmission lines between the couplers. Even so, the electrical length of this connection cannot be made zero and so there is always a reactance that has to be tuned out at a fixed frequency. If it is not tuned out, the through frequency signal, ft, (or at least one of the through frequencies) will see a mismatch and be reflected instead of passing through.

The advantage of this direct coupled technique, using tuned cavities, is that any through frequency can be used and the cavities can be tuned readily in the field to reject (reflect) the injected frequency fi. The disadvantages are:

(a) Even if the cavities are easily tuned in the field, the reactance of the cavity connection must be tuned out for each through frequency;

(b) If a through frequency is not tuned out, there will be poor isolation between the through frequency port and the injected frequency port and excessive insertion loss for the through frequency; and (c) The through frequency will incur different phase shifts in the two transmission lines between the two directional couplers making the aforsaid isolation and insertion loss even worse.

Multiplexers for combining the powers of three or more channels and feeding the combined power to a single master antenna have consisted of a number of diplexers in series, each one in the series, successively adding the power of another FM channel, called the injected channel, to the combined power of the channels added up to that diplexer, called the through channels; and so the powers of all the injected channels are combined at the output of the last diplexer in the series and these are fed to the master antenna. Each diplexer must provide means for insuring a high degree of isolation between the input port thereof carrying the many through channels and the input port thereof carrying the single injected channel.

Where the long stub technique is used, the problems become increasingly more difficult as one progresses along the series, because the number of through channels increases by one at each diplexer, but the frequency band that will pass through the diplexer remains limited to the band between peaks (short circuits) in the frequency characteristic of the long stub.

Where tuned cavities are used, the band between peaks (short circuits) in the frequency characteristics of the tuned cavity is wide enough, but the reactance of the cavity connection can't be tuned out for all the through frequency channels and so some of those channels experience excessive insertion loss through the diplexer and poor isolation from the inserted frequency port.

One object of the present invention is to provide good electrical isolation and low insertion loss in diplexers and/or multiplexers of the types described above and yet avoid some of the limitations of the prior techniques. Other objects of the present invention and features are described hereinbelow.

SUMMARY OF THE INVENTION

It is another object of the present invention to provide an improved diplexer circuit for combining the powers of two different frequency signals.

It is another object to provide an improved multiplexer system for combining the powers of several different frequency signals.

It is another object to provide a multiplexer system combining the powers of several different FM channels and feeding the combined powers to a single master antenna.

It is another object to provide a diplexer for combining the video and audio powers of a TV channel and feeding the combined power to a single master antenna.

It is another object to provide in a diplexer of the type that adds the power of an injected frequency signal to the powers of several through frequency signals, electrical means for isolating the port of the diplexer to which the through channels are fed from the port to which the injected channel is fed, and visa versa, without substantially increasing the insertion loss through the diplexer for any of the channels.

It is another object in conjunction with any of the above objects to provide a diplexer and/or a multiplexer wherein the described isolations and insertion losses are substantially unaffected by environmental changes and/or temperature.

It is another object to provide such a diplexer and/or multiplexer wherein the tuned parts thereof are readily tuned in the field or in situs of operation.

It is another object to provide a diplexer and/or multiplexer incorporating the advantages of both the long stub technique and the direct coupled technique while avoiding the disadvantages of both techniques.

It is a generic feature of the present invention to provide in a diplexer or multiplexer, (where the multiplexer is a system of several diplexers connected in series) in which each diplexer includes two directional couplers, a through coupler and an injection coupler and, a transmission line path between the couplers connecting selected ports of one coupler to the other coupler, so designed that the path conducts substantially all the power of through frequency channels through the injection coupler to the master antenna and conducts substantially all the power of the injected channel through the injection coupler to the master antenna, while at the same time, the ports of the diplexer into which the through channel power is launched and the injection channel power is launched are highly isolated from each other. More particularly, the couplers are both four port directional couplers, two uncoupled ports of the through coupler connect, each by a coupling transmission line to corresponding uncoupled ports of the injection coupler and a tuned cavity, tuned to the injected channel frequency, is connected across each of these transmission lines, each by a cavity stub line of predetermined electrical length in terms of wave lengths of the through frequency ft. As a consequence of connecting these combinations of stub and tuned circuit to, the transmission lines between the couplers all the through channels are transmitted through said lines while at the same time the lines reflect the injected channel. As a further consequence, substantially all of the through power and substantially all of the injected power is routed through the injection coupler to the output port thereof that feeds the master antenna.

A particular embodiment of the present invention is disclosed as a high power TV diplexer for combining video and audio power of the TV channel. Another particular embodiment describes a high power FM multiplexer for combining the powers of several FM channels.

These objects and features of the present invention and others are apparent from the following specific description of embodiments of the invention which are described by way of example as the best known uses of the invention at the present time, all taken in conjunction with the drawings.

DESCRIPTION OF EMBODIMENTS OF THE INVENTION

Generic Features of a Combiner Stage or Diplexer

Figure 9:
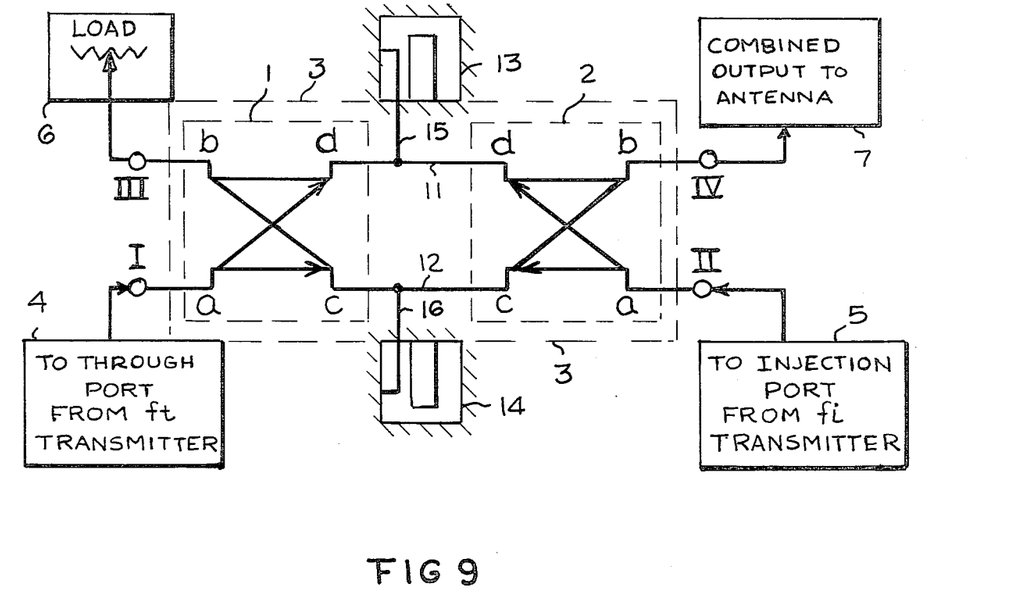
FIG. 9 is a representative electrical diagram of the combiner illustrated in FIGS. 1 to 8 representing electrical features of the combiner.

An understanding of principals of the present invention can be had by reference first to FIG. 9 which shows the electrical features of the hybrid combiner stage in accordance with the present invention. This combiner stage is also referred to as a diplexer, inasmuch as each stage combines signals fed to it at two different ports, the through port and the injection port. In FIG. 9, the combiner includes two four port directional couplers, the through directional coupler, (also called the ft directional coupler 1), and the injection directional coupler, (also called the fi directional coupler 2). The four ports of each of these directional couplers are designated a, b, c, and d as shown in the Figure and these directional couplers can be identical to each other. Of the four ports, a, b, c, and d of each directional coupler, the two ports a and b are uncoupled ports and the two ports c and d are uncoupled ports. Furthermore, in each of these directional couplers, coupling between ports a and c and between ports b and d, is direct and without any phase shift, while coupling between ports a and d and between ports b and c insures a substantial phase shift. Also, inasmuch as the ports a and b of each of these directional couplers are sometimes referred to as the input ports of the directional couplers, the directions of these couplers are represented by the arrows shown in the Figures. It should be understood, however, that the directions represented by the arrows in no way implies that the directional coupler is inidirectionally conductive in that direction; the arrows only mean that the directional coupler is directed in the direction shown.

The coupling factor of each directional coupler determines how power launched into, for example, port a of the coupler is split between ports d and also determines c and the phase difference between power at ports d and c. For example, if the couplers are 3 db directional couplers, then the power is split evenly and the phase difference is 90°; more particularly, the power at terminal d is delayed 90° with respect to the power at terminal c.

The two four port directional couplers 1 and 2 together form the hybrid circuit of the combiner represented by FIG. 9 and this hybrid, denoted 3, has four ports represented as I, II, III and IV. The hybrid ports I and III connect to ports a and b of directional coupler 1 and hybrid ports II and IV connect to ports a and b of directional coupler 2. The hybrid port I, called the through port or the ft input port, receives the output of the preceeding combiner, if several combiners are coupled in series, or it receives the output of a transmitter, the ft transmitter, if the combiner is used a diplexer. Port II of the hybrid, called the injection port, receives the injected channel power, also designated the output of the fi transmitter in this example. Hybrid port III connects to a dumping load 6 and hybrid port IV feeds the combined channel powers (in this example the combined power of the ft transmitter and the fi transmitter) to a common antenna 7, or more particularly to a common transmission line 8 that feeds antenna 7.

Within the hybrid 3 the uncoupled ports d and c of directional coupler 1 connect directly by transmission lines 11 and 12 to the uncoupled ports d and c of directional coupler 2; and to each of these coupling transmission lines is connected a high Q cavity tuned to the injected frequency, (fi from the fi transmitter), at the end of a stub transmission line. More particularly, the tuned cavities 13 and 14 are coupled to the transmission lines 11 and 12 via cavity stub transmission lines 15 and 16, respectively. The cavities have high unloaded Q's on the order of 30,000 and are designed to be resonant at fi, but are not resonant at the through frequencies ft fed to through port I of the hybrid.

In operation, the through frequency (or frequencies) ft launched into hybrid port I are each fed through the two directional couplers 1 and 2 to hybrid port IV over several paths, all of which arrive at port IV in the same phase and so all add at port IV. Power launched into hybrid port I also flows through the hybrid over several paths that arrive at port II of the hybrid, but in opposite phase, and so any ft power to port II essentially cancels. A rigid analysis of this hybrid system will show that substantially all power launched into hybrid port I at a frequency ft is delivered to hybrid port IV and a negligible amount of this power flows to the injection port II and to the dumping load 6 at port III. This flow of power, from port I is unaffected by the presence of the tuned cavities, because the cavities are not tuned to any of the ft frequencies. Furthermore, the electrical length of a cavity stub transmission line, 15 or 16, is substantially an odd integral number of quarter wavelengths of the through frequencies ft. More particularly, each stub line 15 and 16 is preferably at least three quarter wavelengths of the through frequencies ft. Hence, the frequencies ft see a relatively high uniform impedance where stub lines 15 and 16 meet coupling transmission lines 11 and 12, respectfully. As a result, the through frequencies flow through both couplers from port I to port IV at very low insertion loss. On the other hand, power launched into port II at frequency fi to which the cavities are tuned follows several paths through the injection coupler to the coupling transmission lines 11 and 12 to where these lines connect to the stub lines 15 and 16. At those points, power at frequency fi sees a short circuit in the transmission line and reflects back into the directional coupler 2. All such reflected power that flows through directional coupler 2 to hybrid port II cancels at that port whereas all such power that flows back to the hybrid output port IV reinforces at that port. As a consequence, from port IV of the hybrid flows substantially all of the power of ft and fi.

Figure 10:
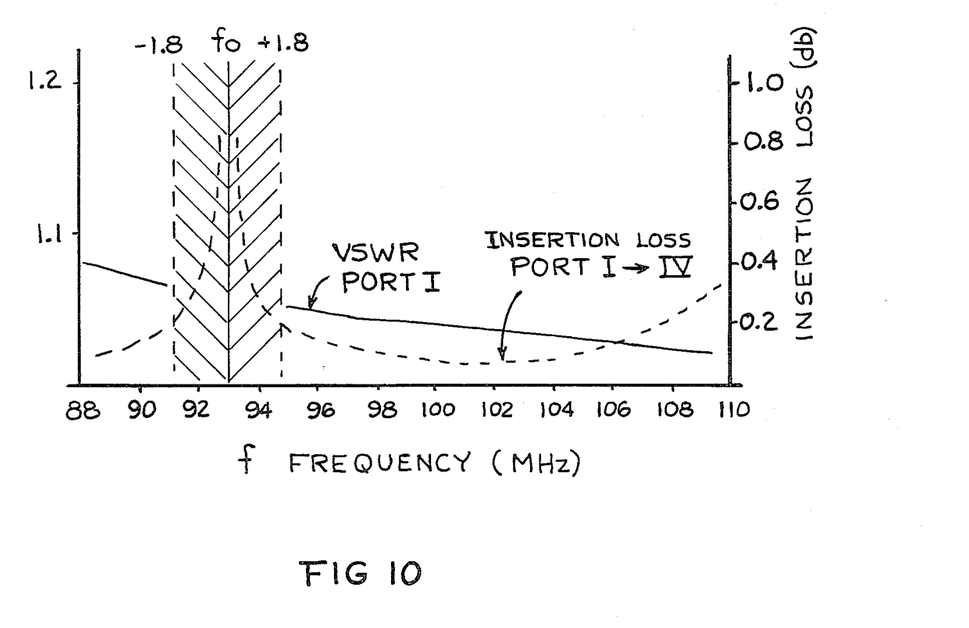
FIG. 10 showns two graphs over the frequency range 88 to 108 MHz, one graph of VSWR at the through channel input port of the combiner and the other graph is a plot of insertion loss from the through port to the output port of the combiner.

The plots in FIG. 10 show the voltage standing wave ratio (VSWR) likely to be found at hybrid port I for a combiner operating in the FM broadcast frequency range 88 to 108 MHz. FIG. 10 also shows a plot of insertion loss from hybrid port I through port IV likely to be found over this operating range. As can be seen, the VSWR at port I is easily maintained under 1.2 over the whole FM band. In this combiner, the insertion loss for power launched into the through port I and the output port IV can easily be maintained less than 0.2 db, provided the frequency or frequencies at the through port are separated by at least 800 KHz from the injected frequency fi. Furthermore, under these conditions, isolation between the hybrid ports I and II in both directions for all frequencies is easily maintained over 30 db.

A Multiplexer of Several Combiners in Series

The combiner illustrated by FIG. 9 can be used as a diplexer for combining two FM channels and feeding them to a common antenna. It can also be used as a stage in a multiplexer for combining many different channels. In FM broadcast systems it is becoming increasingly important to minimize the number of antenna and to couple as many transmitters as possible to a single master antenna.

Figure 11:
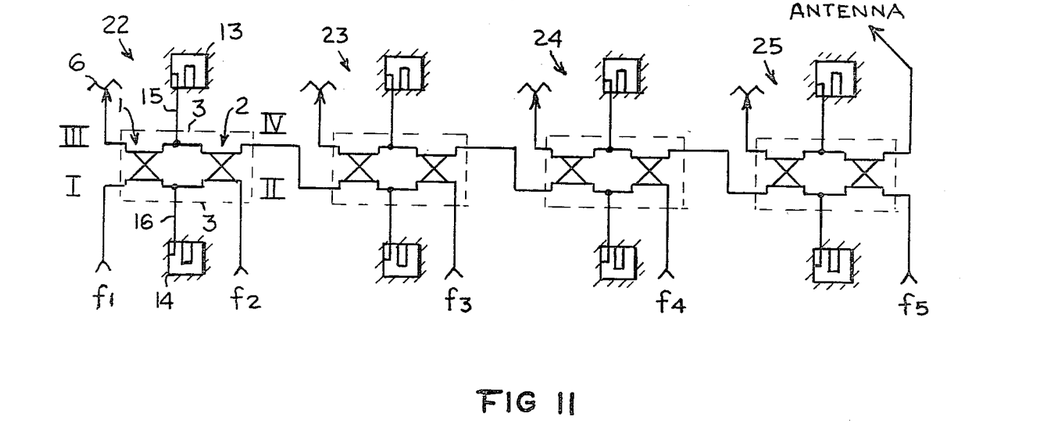
FIG. 11 is an electrical diagram representative of the electrical features of a multiplexer which is a series of four combiners for combining the powers of five FM channels designated $f_1$ to $f_5$.

This use is illustrated by the diagram in FIG. II, showing four stages for combining f1 to f5, each stage being a combiner such as illustrated by FIGS. 9 and 10. For example, the first combiner, 22, combines f1 and f2 and feeds the combined signals to the second combiner 23, which adds f3 to the combination and feeds the total to combiner 24 which feeds f4 to the combination and then to combiner 25 which adds f5. Each of these combiners, 22 to 25, may be constructed identical to each other, except that the cavities are tuned to the added channel. The stub transmission line to each cavity is fixed and has an electrical length that is preferably about three quarter wavelength of the through frequencies, ft.

In combiner 22 the tuned cavities are tuned to the center of the carrier frequency f2 and the separation between f1 and f2 is sufficient that the presence of the cavities have negligible effect on the transmission of the through signal launched into port I of the combiner to the output of the combiner at port IV. By reflection, substantially all power of the injected frequency f2 is also directed to output port IV and so is combined with the through signal. Similarly for the other combiners 23 to 25, the cavities are tuned to the added or injected frequency. More particularly, they are tuned to the center of the carrier frequency of the added channel. In combiner 23 the cavities are tuned to the center frequency of f3, in combiner 24 they are tuned to the center frequency of f4 and in 25 they are tuned to the center frequency of f5.

Figure 12:
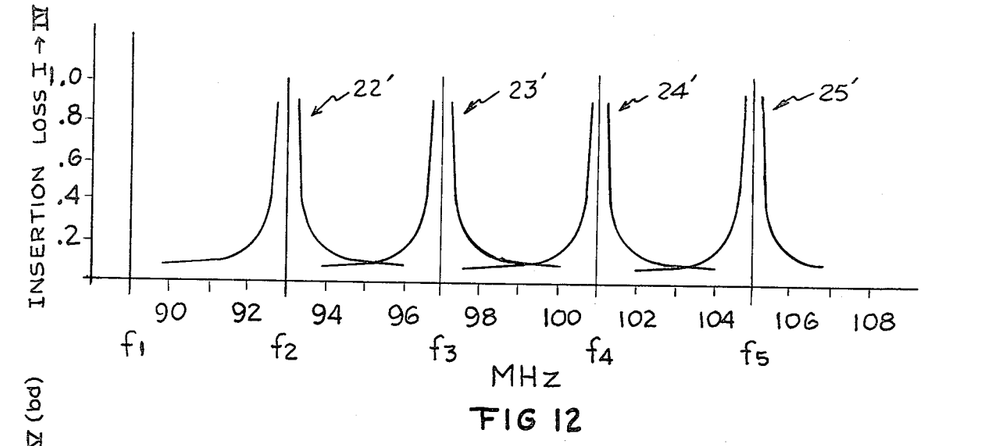
FIG. 12 is a plot of insertion loss over the FM channel frequency range 88 to 108 MHz from the through port to the output port of each of the several stages of the series of combiners represented by FIG. 11.

FIG. 12 includes a plot of insertion loss from port I to port IV (in other words the insertion loss of the through frequency) for each of the combiners 22 to 25, versus the frequency range 88 to 108 MHz that covers the channels. The curves denoted 22' to 25' show the insertion loss from port I to port IV of the combiners 22 to 25, respectively. The channel frequencies f1 to f5 are spaced evenly four MHz apart for illustration purpose; in practice they can be any spacing. This insures that the insertion loss of the through frequencies in each combiner will be a minimum. For example, in combiner 25 the insertion loss incurred by the through frequencies, which are f1, f2, f3 and f4, from the through port I to the output port IV will be less than 0.2 while the insertion loss of the injected frequency from port II to port IV is maintained below 0.3 db. Isolation in both directions between ports I and II remains high, at least 30 db.

Figure 13:
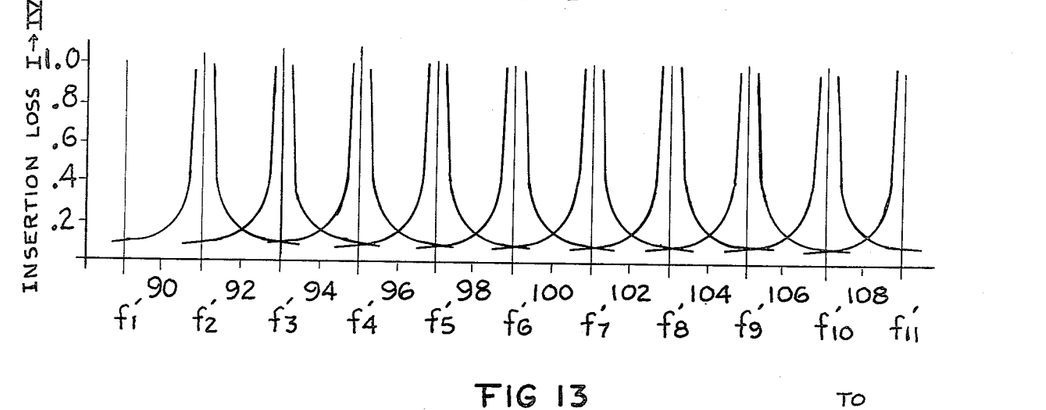
FIG. 13 is also a plot of insertion loss from the through port to the output port of a series including ten combiners for combining eleven FM channels over the frequency range 88 to 108 MHz.

If the requirements of low insertion loss for the through and injected frequencies are relaxed slightly, then a great many more channels can be combined in the frequency range 88 to 108 MHz. For example, if for each combiner or each stage of a multiplexer system, the separation between frequencies is reduced from four MHz to two MHz, then as many as 11 different channels can be combined. This is illustrated by the plot of insertion loss versus frequency shown in FIG. 13. A multiplexer performing as represented by FIG. 13 can include 10 combiners in series for combining 11 channels at carrier frequencies f1' to f11'. For this case, for each of the combiners, the insertion loss for the through frequencies can be slightly higher (approximately 0.2 to 0.3 db) while insertion loss of the injected frequency can be 0.4 to 0.5 db. Within this range of performance, the combiners can all be constructed identical to each other, even as to the cavities, and the cavities can be individually tuneable by mechanical adjustment to the cavity. Hence, the base combiner circuit for the band of channels considered can be a standard unit with tuneable cavities and a number of such combiners, made identical to each other (and so interchangeable), can be connected in series and in each, the cavity is tuned to the injected frequency at the successive stages to perform quite well in multiplexing many FM channels and feeding the combined power of these channels to a single broadcast antenna.

High Power FM Multiplexer

A multiplexer for combining two or more FM channels to a single input master antenna for specific operation over the frequency range 88 to 108 MHz is illustrated by FIGS. 1 to 8. These figures show a single combiner performing as already described particularly with reference to FIGS. 9 and 10. Each of these combiners or stages contains a through or broad band input port and an injected frequency port. The broad band port has a VSWR less than 1.2 over the full band 88 to 108 MHz and the cavities are High Q cavities and easily tuneable to the injected frequency by a simple mechanical adjustment. No special equipment or additional sections to be added to each of these combiners is necessary as they are used in series to perform as a high power FM multiplexer. Unlike a combiner incorporating the long stub technique as in the prior art, with the present invention, additional channels may be added by additional combiners. These can be added at any time and in any order. It is only necessary that the cavities in each combiner be high Q and be connected to the hybrid couplers thereof by stubs of length as close to three quarter wavelengths of the ft frequencies as possible.

Figure 1:
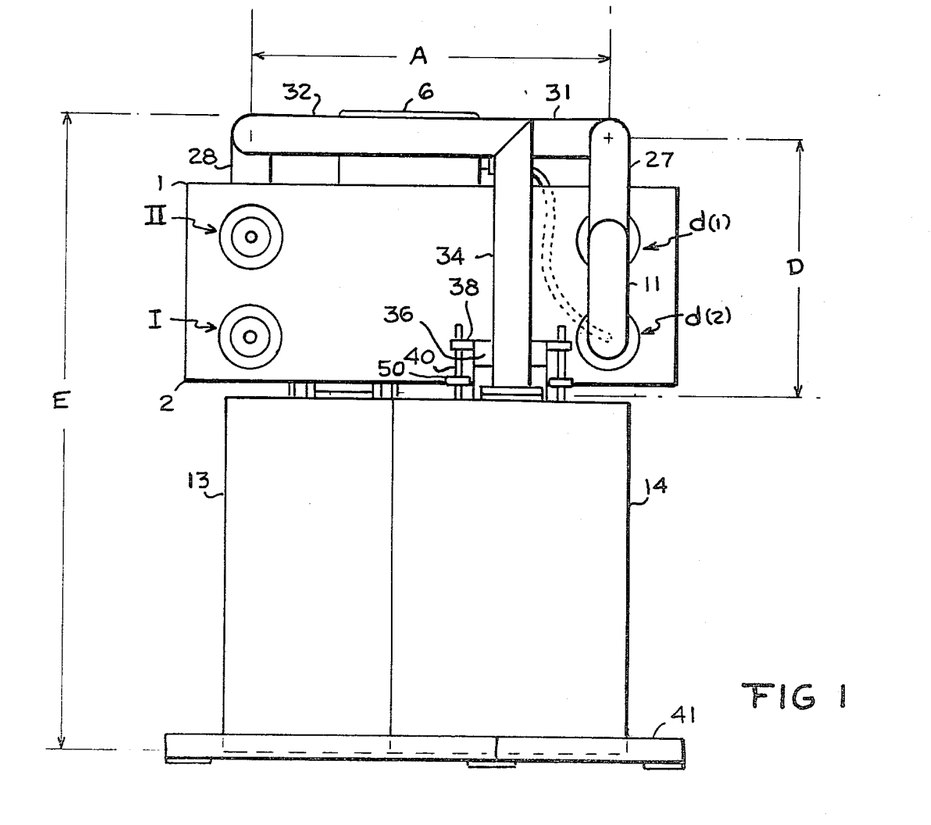
FIGS. 1, 2, and 3 are front, top and side views of one stage of a high power FM multiplexer for combining two or more FM channels in the range 88 to 108 MHz to a single input master antenna with 2.9 MHz separation between channels and incorporating features of the present invention.
Figure 2:
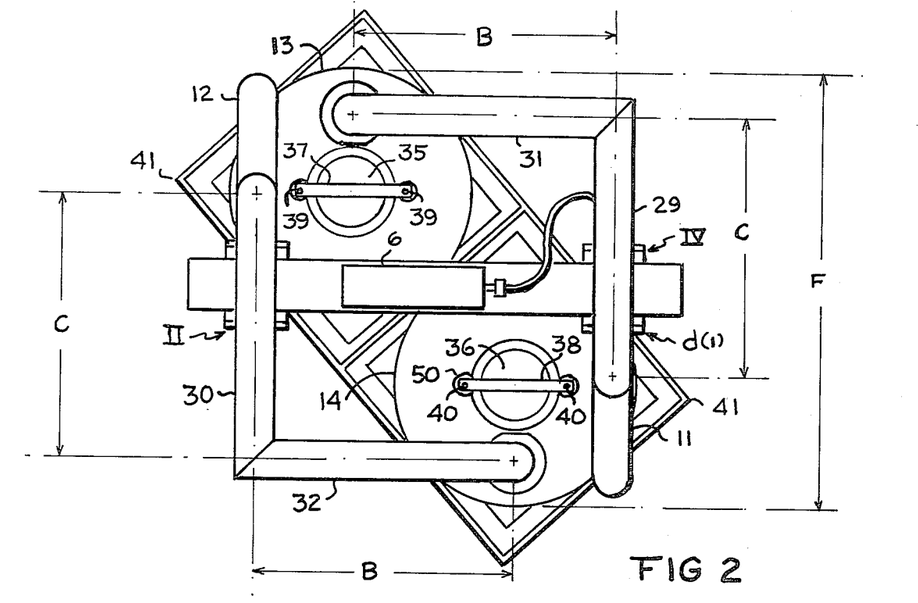
Figure 3:
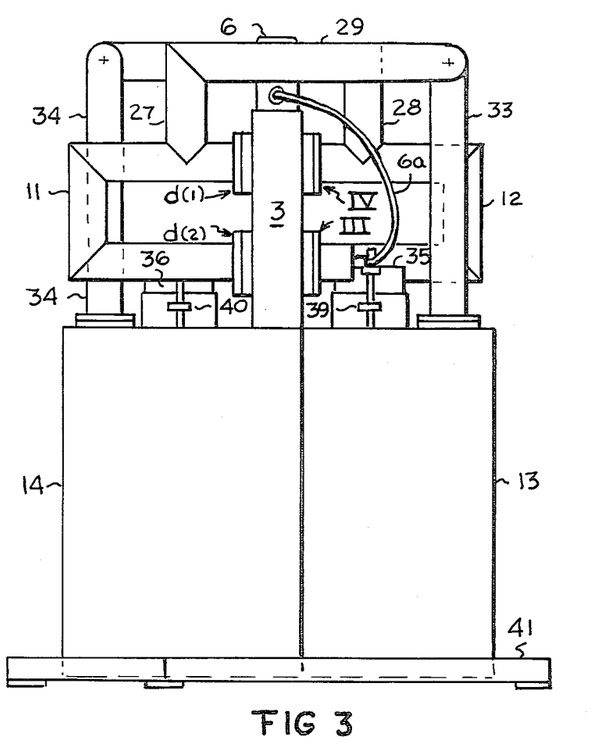

Turning first to FIGS. 1 to 3 there are shown front, top and side views of a stage of the high power FM multiplexer. The hybrid circuit 3 contains two 3 db directional couplers, 1 and 2 having ports I, II, III and IV. Port I is the through frequency port, port II is the injected frequency port, port III couples to the transition load 6 via line 6a, and port IV is the output port that feeds the next stage in the multiplexer or, if it is the last stage, it feeds the broadcast antenna. The coupling transmission lines 11 and 12 between the two directional couplers connect to ports identified as d(1) and d(2), for coupling transmission line 11 and c(1) and c(2), for coupling transmission line 12.

The two high Q tuned cavities 13 and 14 stand below the hybrid circuit 3 and support the circuit and transmission lines interconnecting the circuit. The load 6 is carried on top of the hybrid 3. The tuned cavities 13 and 14 connect to the coupling transmission lines 11 and 12, respectively, by transmission lines 15 and 16, respectively. Each tuned cavity has an adjustable conductive core that is mechanically moved in and out of the cavity to tune the cavity. Thus, the resonant frequency of the cavity is determined by the core position. Cavity 13 is equipped with adjustable core 35 and cavity 14 with adjustable core 36. All transmission lines, coupling transmission lines, and the transmission line stubs 15 and 16 to the cavities are coaxial transmission lines.

The stub transmission lines 15 and 16 to the cavities are both the same length which is calculated to be about three quarter wavelength for any of the frequencies of the band of through frequencies that the combiner is intended to pass. Where several combiners are used in series to form a multiplexer and, for convenience, all the combiners are identical except for the tuning of cavities, the lines 15 and 16 in all the combiners can all be the same length and that length is calculated to be three quarter wavelength, plus or minus 10%, for all frequencies in the band combined by the multiplexer; and, of course, that includes all injected frequencies.

Clearly, since the stub lines 15 and 16 are not tuned, and, for the sake of uniformity, they are all the same length in all combiners in the multiplexer, the stub line length is not precisely three quarter wavelength for many of the through frequencies. However, with a 20% band width objective, the stub line length is readily within ±10% of three quarters wavelength for any of the through frequencies.

Cavity tuning, on the other hand, is so fine that it can be peaked for fi, while at the same time it is flat for all the ft frequencies that must pass through the combiner, even though they are as close as 800 KHz to fi.

Figure 7:
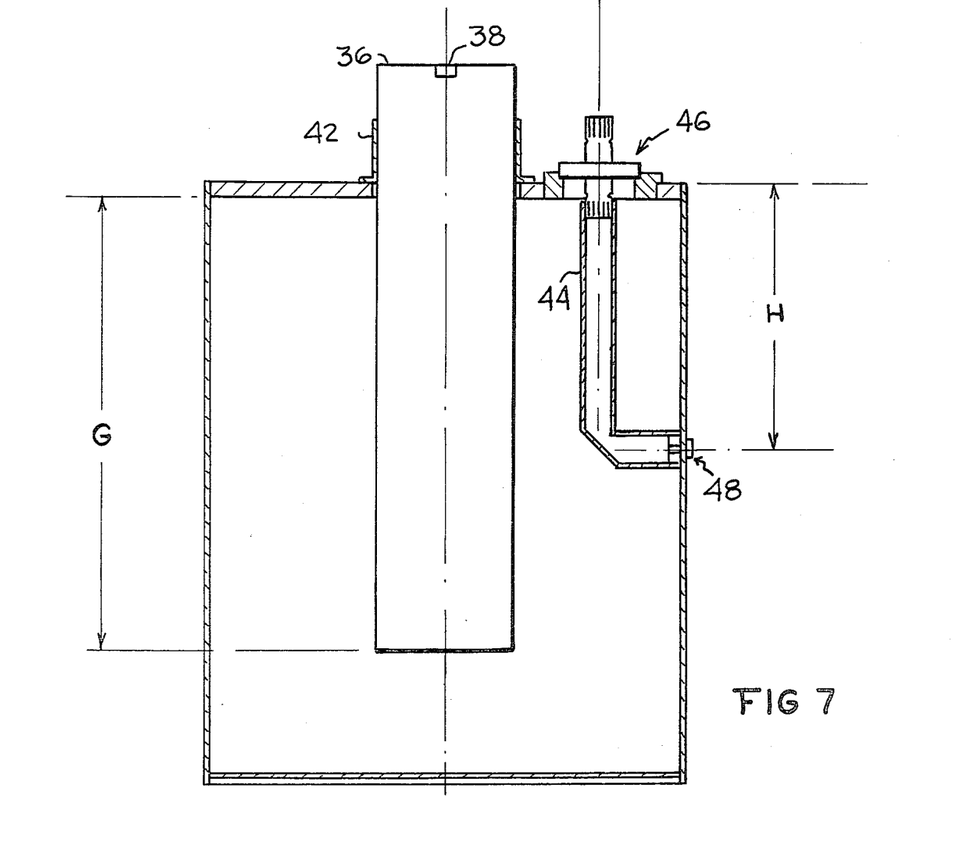
FIGS. 7 and 8 are front sectional and top views of one of the cavity assemblies in the combiner shown in FIGS. 1 to 3.
Figure 8:
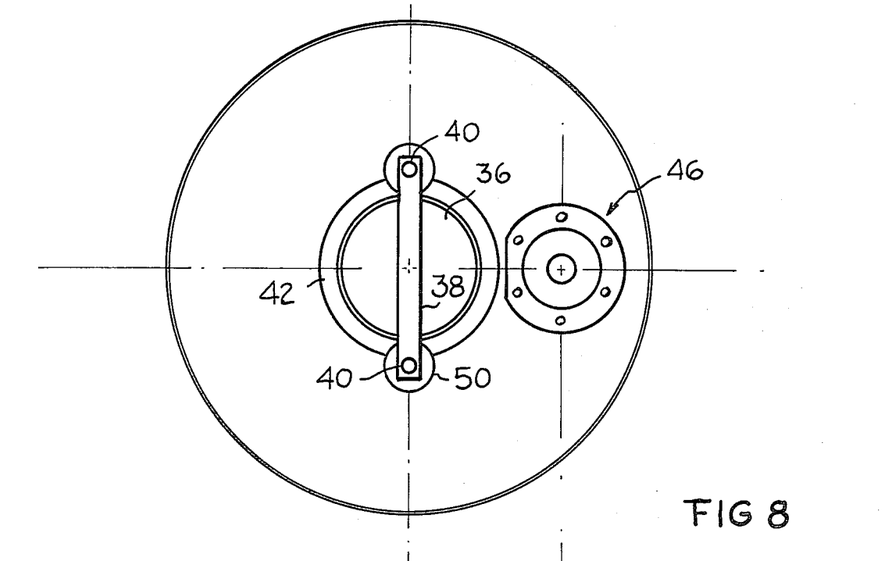

FIGS. 7 and 8 show some detail of a cavity, for purposes of example, it is cavity 14. The cavity is a cylindrical container, electrically sealed with a center core 36 projecting into the cavity along the axis and held slideably by sleeve 42. Thus, the cavity is a reentrant type high frequency cavity. Power from transmission line 12 is coupled to the cavity via the cavity stub transmission line section 16 that connects to coaxial connector 46 located at the top of the cavity. By this connection, the center conductor of the transmission line connects to L-shaped conductor or loop 44 that connects to the cylindrical wall of the cavity at 48.

The length, dimension G, of the core inserted into the cavity to tune the cavity is controlled by the simple mechanical arrangement shown in FIG. 8. This consists of a bar 38 connected across the top end of the core 36 and held by two bolts 40 on either side. These bolts are turned by thumb wheels 50 and threadably engage the bar, so that by turning the thumb wheels together the bar is raised or lowered, withdrawing or inserting the core into the cavity to the desired dimension G.

Figure 4:
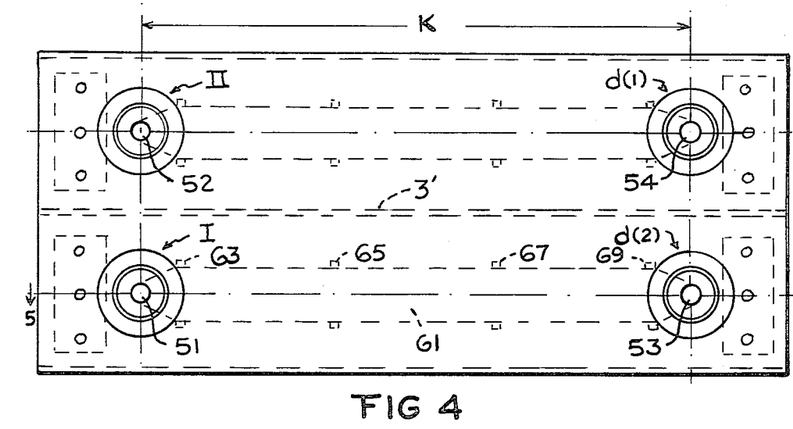
FIGS. 4, 5, and 6 are front, top and side views of the hybrid directional couplers in the combiner (diplexer) illustrated by FIGS. 1 to 3.
Figure 5:
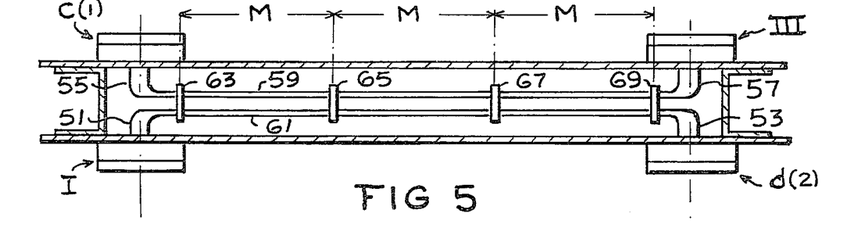
Figure 6:
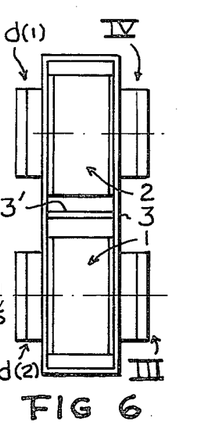

The hybrid circuit 3 is illustrated by FIGS. 4 to 6. It consists of two sealed conductive enclosures 1' and 2' that define the 3 db couplers 1 and 2, respectively. The conductive barrier 3' separates the two enclosures 1' and 2'. Eight coaxial line connectors, four on each side of the hybrid, provide the four ports of the hybrid I, II, III, and IV and the 3 db directional coupler ports interconnected by the coupling transmission lines 11 and 12. These are ports c(1) and d(1) of directional coupler 1 and ports c(2) and d(2) of directional coupler 2. The construction of each of these 3 db directional couplers is the same and is revealed by the cross section view of coupler 1 shown in FIG. 5.

Turning to FIG. 5, the center conductor of ports I and d(1), 51 and 53, respectively, are connected together by conductive strip 61. Similarly, center conductors 55 and 57 of ports c(1) and III are connected together by strip conductor 59. The strip conductors 59 and 61 are spaced apart uniformly from one end to the other and shunted together at four spaced points, spaced apart by the dimensions M.

Directional couplers of the construction shown by FIGS. 4 to 6 are each four port, 3 db directional couplers and are capable of handling 100 Kwatts, continuous wave power. For example, in directional coupler 1, the pair of directly coupled ports between which there is 90° phase shift are ports I and c(1) and ports III and d(1). The pairs of ports that are coupled and experience no phase shift are the ports I and d(1) and the port III and c(1). The uncoupled pairs of ports are I and III and c(1) and d(1). Inasmuch as port I is the input port and ports c(1) and d(1) are the output ports, the arrows shown in the equivalent circuit diagram in FIG. 9 indicates the direction of this directional coupler. A similar analysis applies to 3 db directional coupler 2.

The dimensions A through H and K and M are for a combiner constructed in accordance with FIGS. 1 through 8 operated at average frequencies of 95.8 and 96.7 and are listed in the Table below.

TABLE

| Average Freq. MHz | Inches | | | | | | | | | | |
|---|---|---|---|---|---|---|---|---|---|---|---|
| | A | L | B | C | D | E | F | G | H | K | M |
| 95.8 | 30.8 | 9.4 | 21.2 | 23.2 | 21.0 | 57.7 | 37.0 | 26.6 | 10.0 | 30.8 | 8.67 |
| 96.7 | 30.8 | 9.3 | 22.0 | 22 | 21.4 | 58.8 | 37.0 | 26.6 | 10.0 | 30.8 | 8.67 |

The cavity stub lines 15 and 16 are of equal length and, from where they meet coupling lines 11 and 12, respectively, to their respective cavities, 13 and 14, they are made up of sections. For example stub 15, from the point of connection to line 11 to cavity 13 is made up of sections 27, 29, 31 and 33 of dimensions L, C, B and D respectively. For operation at an average frequency of 95.8 MHz, these sections add up to 74.8 inches. This is within 10% of three quarter electrical wavelength of a 95.8 MHz signal in stub line 15.

The combiner illustrated by FIGS. 1 through 8 is installed and used satisfactorily when the cavities 13 and 14 nest in a frame or platform 41, upright as shown in the Figures, but not attached to the frame. The cavities carry the hybrid 3 which in turn carries the load 6 and the hybrid is suspended above the cavities by connection of the transmission line stubs 15 and 16 to the coupling transmission lines 11 and 12 of the hybrids. Stub transmission lines 15 and 16 attach to and are carried by the cavities. This arrangement permits thermal expansions to occur due to changing ambient conditions and/or power dissipated by this system without alterating electrical characteristics. By this arrangement, excellant short and long term stability is achieved.

Representative embodiments of the present invention described herein and illustrated by equivalent electrical diagrams all incorporate the generic features of the invention, whereby a frequency combiner, diplexer or multiplexer is provided for combining two or more different frequency signals, also called frequency channels, in a common transmission line that may feed a common broadcast antenna. These embodiments as well as the specific high power FM multiplexer are described by way of examples of uses of the invention and application of the principles of the invention. Clearly, other variations and arrangements can be devised in accordance with the principles by those skilled in the art without deporting from the spirit and scope of the invention.

What is claimed is:

1. A high frequency signal combiner for combining the power of two different frequency signals ft and fi in a common transmission line comprising,
 (a) two directional couplers, an ft coupler and an fi coupler,
 (b) means for coupling ft to a port of the ft coupler
 (c) means for coupling fi to a port of the fi coupler,
 (d) an output to the common transmission line from a port of the fi coupler and
 (e) means including a transmission line stub and a tuned circuit for coupling together other ports of the ft and fi couplers that readily transmit ft signals from the ft coupler to the fi coupler while reflecting fi signals from the fi coupler back to the fi coupler,
 (f) whereby substantially all of the ft and fi signal power to the couplers is fed from the output to the common transmission line.

2. A high frequency signal combiner as in claim 1 wherein said last mentioned means provides a relatively high impedance to ft and relatively low impedance to fi.

3. A high frequency signal combiner as in claim 1 wherein said tuned circuit is tuned to fi.

4. A high frequency signal combiner as in claim 1 wherein said last mentioned means includes between ports of the couplers a coupling transmission line, the stub is connected thereto and the tuned circuit is at the end of the stub and is resonant at fi.

5. A high frequency signal combiner as in claim 1 wherein
 (a) said last mentioned means includes between ports of the couplers a coupling transmission line directly connected to corresponding ports of the couplers and
(b) the stub and tuned circuit in combination is coupled to said coupling transmission line producing, in effect, a short circuit in said line with respect to fi, but not with respect to ft.

6. A high frequency signal combiner as in claim 5 wherein,
(a) the stub connects at one end thereof across the conductive elements of the coupling transmission line and
(b) the tuned circuit connects to the other end of the stub.

7. A high frequency signal combiner as in claim 6 wherein,
(a) in the ft coupler, the ports coupled to the fi coupler are uncoupled ports thereof and
(b) in the fi coupler, the ports coupled to the ft coupler are uncoupled ports thereof.

8. A high frequency signal combiner as in claim 1 wherein,
(a) the transmission line stubb is substantially an odd integral number of quarter wave lengths of ft in electrical length and
(b) the tuned circuit is resonant at fi.

9. A high frequency signal combiner as in claim 8 wherein, the odd integral number is three.

10. A high frequency signal combiner as in claim 9 wherein,
(a) the stub connects at one end thereof across the conductive elements of the coupling transmission line and
(b) the tuned circuit connects to the other end of the stub.

11. A high frequency multiplexer for combining the power of n different frequency signals $f_1, f_2, f_3, \ldots f_n$ in a common transmission line comprising,
(a) a plurality of pairs of four port directional couplers, the pairs being coupled together in series,
(b) each pair having two input ports called the through port and the injection port,
(c) each pair having an output port,
(d) the output port of each pair being coupled to the through port of the next pair in the series,
(e) the output port of the last pair in the series being coupled to the common transmission line,
(f) at least one other port of one coupler of a pair being coupled to another port of the other coupler of the pair by coupling means that readily transmits signals from the through port to the output port of the pair while reflecting signals from the injection port to the output port of the pair
(g) said n different frequency signals being fed to selected injection ports in the series,
(h) whereby the n signals are combined in the common transmission line.

12. A high frequency multiplexer as in claim 11 wherein,
(a) the two couplers of each pair are the through coupler and the injection coupler,
(b) the through port of a pair is a port of the through coupler,
(c) the injection port of a pair is a port of the injection coupler and
(d) the output port of a pair is a port of the injection coupler.

13. A high frequency multiplexer as in claim 12 wherein, a port of the through coupler of each pair is coupled to a load.

14. A high frequency multiplexer as in claim 12 wherein said last mentioned means includes a coupling transmission line connecting the through and injection couplers, a tuned circuit and a transmission line stub connecting the tuned circuit to the coupling transmission line, the length of the stub and the tuning of said circuit being such that the coupling transmission line is a relatively high impedance to signals fed to the through port and relatively low impedance to signals fed to the injection port.

15. A high frequency multiplexer as in claim 14 wherein, the signals fed to the through port are transmitted past the stub while signals fed to the injection port are reflected at the stub.

16. A high frequency multiplexer as in claim 15 wherein said tuned circuit is tuned to the frequency of the signals fed to the injection port of the pair.

17. A high frequency multiplexer as in claim 16 wherein the electrical length of the transmission line stub is substantially an odd integral number of quarter wave lengths of the frequency signals fed to the through port.

18. A high frequency multiplexer as in claim 17 wherein the odd integral number is three.

19. A high frequency multiplexer as in claim 18 wherein,
(a) the said tuned circuits for successive pairs of directional couplers are tuned to successively higher frequencies among the frequencies $f_1, f_2, f_3 \ldots f_n$.

20. A high frequency multiplexer as in claim 19 wherein the tuned circuit is a high Q tuneable cavity connected to the coupling transmission line between the directional couplers of a pair by the transmission line stub, so that where the stub connects to the coupling transmission line, the frequency signal fed to the injection port of the pair is reflected, while, at the same time, there is negligible effect on the frequency signals fed to the through port.

21. In a high frequency diplexer for combining the powers of two frequency channels of carrier frequencies $f_1$ and $f_2$, to a single master antenna, where $f_1$, called the through channel, is fed to the antenna via a through coupler and an injection coupler of the diplexer and $f_2$, called the injected channel, is fed to the antenna via the injection coupler of the diplexer, the improvement comprising,
(a) in selected coupling transmission lines between the through and injection couplers, a cavity that is resonant to f2 and not resonant to $f_1$, connected to the selected transmission line by a stubb transmission line of electrical length that is three quarter wave length of $f_1$,
(b) whereby substantially all of $f_1$ power flows through both couplers to the antenna and substantially all of $f_2$ power flows through the injection coupler to the antenna.

22. A high frequency diplexer as in claim 21 wherein,
(a) the selected transmission line between the couplers is a two element transmission line,
(b) the stub transmission line is a two element transmission line
(c) corresponding elements of said coupling and stub transmission lines connect at one end of the stub transmission line and
(d) the tuned cavity is a high Q cavity and is connected to the other end of the stub transmission line,
(e) whereby the coupling transmission line offers substantially its characteristic impedance to $f_1$, but is a short circuit to $f_2$.

* * * * *